United States Patent [19]

Seon

[11] Patent Number: 5,013,538

[45] Date of Patent: May 7, 1991

[54] PREPARATION OF ALKALINE EARTH METAL TITANATES

[75] Inventor: Francoise Seon, Montreuil, France

[73] Assignee: Rhone-Poulenc Chimie, Courbevoie, France

[21] Appl. No.: 321,205

[22] Filed: Mar. 9, 1989

[30] Foreign Application Priority Data

Mar. 9, 1988 [FR] France .................... 88 03019

[51] Int. Cl.⁵ .............................. C01G 23/08
[52] U.S. Cl. .................. 423/608; 423/593; 423/598
[58] Field of Search ............ 423/598, 608, 593

[56] References Cited

U.S. PATENT DOCUMENTS 4,293,534 10/1981 Arendt ................. 423/593
4,748,016 5/1988 Browaeys ............. 423/598

FOREIGN PATENT DOCUMENTS 0027737 4/1981 European Pat. Off. .

OTHER PUBLICATIONS

"Molten Lithium Nitrate-Potassium Nitrate Eutectic: The Reaction of Compounds of Titanium," Kerridge et al, J. Inorg. Nucl. Chem., vol. 37, pp. 2257–2260, Pergamon Press, 1975.

Primary Examiner—Peter D. Rosenberg
Attorney, Agent, or Firm—Burns, Doane, Swecker & Mathis

[57] ABSTRACT

The alkaline earth metal titanates, well adopted for electronics applications, e.g., homogeneous powders of barium or strontium titanate, are prepared by directly reacting, in a molten salt bath medium, (a) at least one titanium compound, with (b) at least one compound A reactive therewith to generate the species $TiO_3^{2-}$, and (c) at least one alkaline earth metal nitrate.

25 Claims, No Drawings

PREPARATION OF ALKALINE EARTH METAL TITANATES

BACKGROUND OF THE INVENTION

1. Field of the Invention

The present invention relates to the preparation of alkaline earth metal titanates, and, more especially, to the preparation of alkaline earth metal titanates directly in the form of homogeneous powders by chemical reaction in molten salt baths.

2. Description of the Prior Art

The alkaline earth metal titanates, and, in particular, barium titanate, are known to this art to have preferred applications in the preparation of ceramic compositions, notably intended for the production of electric capacitors and resistors. Different methods for the preparation of barium titanate are also known to this art. In particular, such compound may be prepared by solid-state reaction between a barium salt including a volatile anion, for example barium carbonate, and titanium dioxide.

However, this method has the disadvantage of delicate controls, as it is based on slow and difficult diffusion reactions between crystallized solids, requires very high temperatures and often presents the risks, on the one hand, of formation of heterogeneous solid solutions, and, on the other, the introduction of detrimental impurities during the subsequent grinding stage, which generally must be carried out after calcination.

More recently, it was discovered that it is also possible to prepare the subject titanates via the calcination or thermal decomposition of precursor compounds produced by various reactions taking place in liquid phase, typically aqueous phase. The major disadvantage of this method resides in the difficult control of the quality of the precursors obtained, such that the pyrolysis of the latter may result in the production of barium titanate particles, the composition and/or the particle size distribution of which are relatively heterogenous.

A third and more favorable method is described in U.S. Pat. No. 4,293,534, which method is based on direct chemical reactions conducted in molten salt baths of the hydroxide type, according to the following general reaction scheme:

$$BaO + TiO_2 \rightarrow BaTiO_3$$

or $$SrO + TiO_2 \rightarrow SrTiO_3$$

From the different examples presented in this '534 patent, it will be seen that the industrial application of the process described requires at least four distinct and successive stages, which are:

(1) The suspension, under vigorous agitation in water, of a mixture of $TiO_2$ and $Sr(NO_3)_2$ in proportions corresponding to the stoichiometry of the final product;

(2) The addition to such suspension of a highly concentrated solution of sodium hydroxide and potassium hydroxide (solution near saturation), having the effect of causing the formation of a gel; over the course of this operation $Sr(NO_3)_2$ is converted into $Sr(OH)_2$;

(3) Heating the gel thus obtained at a temperature on the order of 200° to eliminate the water and effecting the conversion of $Sr(OH)_2$ into $SrO$;

(4) Calcination at elevated temperatures (600°) such that, in a bath of molten hydroxides, the following reaction is carried out:

$$SrO + TiO_2 \rightarrow SrTiO_3$$

It follows from the above analysis that the process described in the '534 patent is difficult to carry out (crucibles must be changed between stage 3 and stage 4), is of long duration (total duration of more than 15 hours) and is quite expensive relative to energy requirements (evaporation of a large amount of water, relatively high calcination temperatures) and that, in its final stage, the process reverts to reacting a titanium oxide and a barium or strontium oxide in a more than 40% by weight molten hydroxide bath.

Furthermore, the quality of the final products may be inadequate.

SUMMARY OF THE INVENTION

Accordingly, a major object of the present invention is the provision of an improved process for the preparation of alkaline earth metal titanates which is conspicuously devoid of those disadvantages and drawbacks to date characterizing the state of this art, and which improved process is not only simple, efficient, economical and easily carried out, but also enables preparation of such alkaline earth metal titanates both reliably and reproducibly, and directly in the form of powders which are homogeneous both as to morphology and composition.

Briefly, the present invention features an improved process for the preparation, in a bath of molten salts, of an alkaline earth metal titanate of the formula $MTiO_3$, wherein M is an alkaline earth metal, comprising directly reacting in said molten bath medium:

(a) at least one compound of the element titanium;

(b) at least one compound A which reacts with such titanium compound in said molten bath medium to generate the species $TiO_3^{2-}$;

(c) at least one nitrate of the alkaline earth metal M; and then recovering, after separation from the reaction medium, the desired alkaline earth metal titanate final product.

DETAILED DESCRIPTION OF THE PREFERRED EMBODIMENTS OF THE INVENTION

More particularly according to the present invention, in a preferred embodiment thereof, the nitrate of the alkaline earth metal M also constitutes, at least in part, the molten bath solvent medium in which the subject reaction is carried out.

The compounds of the element titanium suitable for use in the present invention are advantageously selected, either individually or as admixtures thereof, from among titanium dioxide $TiO_2$, titanium hydroxides, titanium hydroxyhalides and titanium carbonates.

The preferred titanium compounds according to the invention are titanium dioxide and the titanium halides.

The titanium halides and oxyhalides preferably are titanium chloride and titanium oxychloride. Any other titanium or titanyl halide, such as the bromides, iodides or fluorides, is also contemplated hereby. In particular, titanium trichloride, $TiCl_3$, titanium tetrachloride, $TiCl_4$, and titanium oxychloride, $TiOCl_2$, are also contemplated.

A titanium hydroxide that is particularly representative is Ti(OH)$_4$.

The compounds A defined above are preferably selected from among the hydroxides and carbonates of the alkali or alkaline earth metals, and, even more preferably, from among the alkali metal hydroxides, such as sodium or potassium hydroxide. Sodium hydroxide is especially preferred.

From a practical point of view, the preferred alkaline earth metals according to the present invention are barium and strontium, as these elements provide the discharge capability required for the electronic applications of the titanates.

The choice of the nature of the bath of molten salts which constitutes the solvent medium for the reaction for the formation of the desired titanate, is governed generally by two practical requirements: (i) the reacting compounds must firstly be soluble, at least in part in the molten bath; and, secondly, (ii) the product of reaction must have a low solubility.

Naturally, it is preferred to conduct the operation using bath compositions having the lowest possible melting point, on the one hand to prevent excessive consumption of energy, and, on the other, to avoid technical problems, in particular corrosion. For these reasons, it may be advantageous to utilize eutectic compositions.

The molten salt baths according to the present invention, thus, are advantageously molten halides, preferably the chlorides, either with or without fluorides, or alkali metals and/or alkaline earth metals, or nitrates of the alkali and/or alkaline earth metals, or mixtures of these.

In a particular and preferred embodiment, in which the nitrate of the alkaline earth metal participating in the reaction of formation of the desired titanate, such nitrate also serves to create the molten medium constituting the reaction solvent, i.e., in the case in which the molten salt bath is both the reagent and the solvent, it is preferable that such molten salt bath include only nitrates, and more particularly a mixture of the nitrate of the alkaline earth metal M and alkali metal nitrates.

Also, if it is desired to prepare barium titanate, the molten salt bath preferably will include, for example, a mixture of barium nitrate/sodium nitrate, or a mixture of barium nitrate/potassium nitrate. Similarly, if the desired product is strontium titanate, binary mixtures of the strontium nitrate/potassium nitrate or strontium nitrate/sodium nitrate type may be used.

The temperature of the reaction to form the desired titanate advantageously ranges from 100° C. to 700° C., preferably from 350° to 500° C.

A temperature within this range is sufficiently low to limit the consumption of energy and the aforementioned technical problems, but high enough such that the kinetics of the reaction according to the present process are rapid and, thus, compatible with good industrial operations.

The amounts of the reagents required for carrying out the present process must correspond, at a minimum, to the stoichiometric amounts necessary for carrying out the reaction in the particular reaction medium selected, with such amounts deriving naturally from the nature of the initial reagents.

Thus, as an example, if TiO$_2$ is the precursor of the element titanium, and NaOH is the compound A as defined above, the following overall reaction will take place:

$$TiO_2 + 2\ NaOH + M(NO_3)_2 \rightarrow MTiO_3 + 2\ NaNO_3 + H_2O$$

If, for example, TiO$_2$ is replaced by TiCl$_3$, with the other compounds remaining the same, the reaction becomes:

$$2\ TiCl_3 + 10\ NaOH + 2\ M(NO_3)_2 \rightarrow 2\ MTiO_3 + NaNO_2 + 3\ NaNO_3 + 6\ NaCl + 5H_2O.$$

It will be appreciated that, in the above reactions, sodium hydroxide (compound A) must be present in the reaction medium in an amount sufficient to react with the titanium compound such as to generate the species TiO$_3^2$, but in an amount insufficient to cause the conversion of the alkaline earth metal nitrate participating in the reaction into its oxide, MO. The retention of the alkaline earth metal M in its nitrate form thus constitutes one of the essential differences of the present process from that described in U.S. Pat. No. 4,293,543.

It will also be appreciated that, for the reaction of formation of the desired titanate to always take place in the molten phase, it is necessary to begin with an initial composition of the bath such that its variation over the course of the reaction does not cause the setting of the molten phase at the reaction temperature.

In a practical embodiment for carrying out the process according to the invention, a bath of molten salts is initially prepared, containing solvating compounds, the nitrate of the alkaline earth metal M and the compound A, and then the titanium compound is contacted with said bath of molten salts, with the titanium compound being present in the liquid, solid or gaseous state.

This contacting preferably is carried out under an inert atmosphere, for example under a flowstream of argon.

The alkaline earth metal titanate formed and precipitated in the reaction (in a very high yield, often exceeding 90% by weight) is solid in the abovementioned temperature range and, therefore, may be readily separated from the reaction medium, which is gradually enriched in different reaction products, with said products remaining in the molten state.

Thus, after completion of the reaction, the titanate may be separated from the molten bath by any known means, in particular by filtration, whereby, on the one hand, the desired titanate is extracted in the form of a powder, and, on the other, a mixture of molten salts is obtained, the composition of which may be adjusted over the course of the reaction by the addition of reagents, such that the process will operate continuously.

Of course, it is also possible to conduct the reaction discontinuously, i.e., wait until all of the titanium compound introduced at one time has reacted, then, upon completion of the reaction, cool the reaction mass, and, finally, separate the titanate from its matrix of salts, by disintegrating the latter by a washing with pure or slightly acidified water.

The alkaline earth metal titanate recovered by one of these methods (continuous or discontinuous) is present in the form of a chemically and morphologically very homogeneous powder, which may be further purified simply by washing it with pure or acidified water, followed by drying.

It may be desirable to utilize a final grinding stage to obtain a rigorous grain size distribution of the powder.

The alkaline earth metal titanate powder produced is suitable for production, by sintering, of dense, high purity shaped articles particularly suitable for the electronics industry.

In order to further illustrate the present invention and the advantages thereof, the following specific examples are given, it being understood that same are intended only as illustrative and in nowise limitative.

EXAMPLE 1

Into 416.5 g of an initial molten bath having the following composition (by weight):
Ba(NO$_3$)$_2$: 39.6%
KNO$_3$: 45.9%
NaOH: 14.5%
maintained at a temperature of 450° C., under argon, and stirred to 550 rpm, 50.4 g titanium oxide were introduced in powder form, to effect the reaction:

$$[Ba(NO_3)_2 + 2\ NaOH] + TiO_2 \rightarrow BaTiO_3 + 2\ NaNO_3 + H_2O$$

with the NaOH being present in a 20% by weight stoichiometric excess.

Over the course of the reaction, the molten phase was enriched in NaNO$_3$ at the expense of the Ba(NO$_3$)$_2$, but always remains perfectly liquid.

Upon completion of the reaction, on the one hand, approximately 308 g of a bath having the following weight composition was obtained: KNO$_3$ (62%) NaNO$_3$ (34.7%) NaOH (3.3%), and, on the other, approximately 136.5 g of precipitated barium titanate.

The yield of barium titanate was 93% by weight.

It was noted that, during this experiment, the proportion of the masses in the solid phase (TiO$_2$ or BaTiO$_3$) and the liquid phase in the reaction medium, varied from 12% at the beginning of the reaction to 50% at the completion of the reaction.

Following the destruction of the reaction mass by washing with pure or acidified water, followed by drying at 40° C., a high purity barium titanate powder (identified by X-ray) was recovered, the Ba/Ti ratio of which was 0.99, its mean grain size was 0.45 μm and its specific surface was 10 m$^2$/g.

Subsequent calcination at 700° or 1,000° C. enabled production of a final product, the Ba/Ti ratio of which was adjusted to exactly 1 and which had a mean grain size, respectively, of 0.8 μm and 1.2 μm and a specific surface, also respectively, of 6 m$^2$/g and 2 m$^2$/g.

EXAMPLE 2

Into 404 g of an initial molten bath having the following composition (by weight):
Ba(NO$_3$)$_2$: 40.8%
KNO$_3$: 47.3%
NaOH: 11.9%
maintained at a temperature of 450° under argon and stirred at 550 rpm, 30.2 g TiCl$_3$ were introduced in the powder form, to effect the reaction:

$$[2\ Ba(NO_3)_2 + 10\ NaOH] + TiCl_3 \rightarrow 2\ BaTiO_3 + NaNO_2 + 3\ NaNO_3 + 6\ NaCl + 5\ H_2O.$$

The initial charge was calculated such that there was a 23% by weight stoichiometric excess of NaOH, and a 2.2% by weight stoichiometric excess of Ba(NO$_3$)$_2$.

During the reaction, the composition of the molten phase varied from the initial composition as follows:
Ba(NO$_3$)$_2$: 29.9%
KNO$_3$: 50.3%
NaNO$_3$: 6.6%
NaNO$_2$: 1.8%
NaOH: 2.4%
NaCl: 9 0%

In this example, the molten mass varied slightly, changing from 404 g to 379 g upon completion of the reaction; the ratio between the solid mass and the mass of the molten phase also varied slightly, changing from 7.5% by weight at the onset of the reaction, to 11% by weight upon completion of the reaction. The mass of BaTiO$_3$ obtained upon completion of the reaction was 40 g, indicating a reaction yield of such final product of 88% by weight. This barium titanate (identified by X-ray) was present in the form of a powder having a mean grain size of 5 μm and a Ba/Ti ratio of 0.98.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the preparation of an alkaline earth metal titanate having the formula MTiO$_3$, wherein M is an alkaline earth metal, comprising directly reacting, in a medium which comprises a molten salt bath, (a) at least one titanium compound, with said titanium compound A reactive with said titanium compound to generate the species TiO$_3^{2-}$, and (c) at least one alkaline earth metal nitrate, MNO$_3$, reactive in said molten salt bath medium to produce said alkaline earth metal titanate.

2. The process as defined by claim 1, said at least one alkaline earth metal nitrate (c) also comprising said molten salt bath.

3. The process as defined by claim 1, said at least one titanium compound (a) comprising titanium dioxide, a titanium halide, a titanium oxyhalide, a titanium hydroxyhalide or a titanium carbonate.

4. The process as defined by claim 3, said at least one titanium compound (a) comprising titanium dioxide or a titanium halide.

5. The process as defined by claim 4, said at least one titanium compound (a) comprising a titanium chloride.

6. The process as defined by claim 5, said at least one titanium compound (a) comprising titanium trichloride or titanium tetrachloride.

7. The process as defined by claim 1, said at least one compound A comprising an alkali or alkaline earth metal hydroxide or carbonate.

8. The process as defined by claim 7, said at least one compound A comprising an alkali metal hydroxide.

9. The process as defined by claim 8, said at least one compound A comprising sodium hydroxide.

10. The process as defined by claim 1, said molten salt bath medium comprising at least one alkali or alkaline earth metal halide or nitrate.

11. The process as defined by claim 10, said molten salt bath medium comprising admixture of a nitrate of an alkaline earth metal M and an alkali metal nitrate.

12. The process as defined by claim 1, wherein M is barium or strontium.

13. The process as defined by claim 1, said at least one alkaline earth metal nitrate (c) also comprising said molten salt bath medium.

14. The process as defined by claim 1, said molten salt bath medium comprising barium nitrate/sodium nitrate, barium nitrate/potassium nitrate, strontium nitrate/potassium nitrate, or strontium nitrate/sodium nitrate admixture.

15. The process as defined by claim 1, comprising the preparation of barium titanate.

16. The process as defined by claim 1, comprising the preparation of strontium titanate.

17. The process as defined by claim 1, said at least one titanium compound being present in liquid, gaseous or solid state.

18. The process as defined by claim 1, carried out under an inert atmosphere.

19. The process as defined by claim 1, comprising recovering said alkaline earth metal titanate in homogeneous powder form.

20. The process as defined by claim 1, comprising recovering said alkaline earth metal titanate.

21. The product of the process as defined by claim 1.

22. The process as defined by claim 1, wherein said compound A is present in an amount insufficient to cause conversion of said alkaline earth metal nitrate, $MNO_3$, to an alkaline earth metal oxide thereof, MO.

23. The process as defined by claim 1, wherein said molten salt bath is initially prepared containing solvating compounds comprising said nitrate and the alkaline earth metal, $MNO_3$, and said compound A, and then said titanium compound is added to said molten salt bath.

24. The process as defined by claim 1, wherein said molten salt bath is initially prepared by maintaining $ba(NO_3)_2$, $KNO_3$ and NaOH at a temperature so as to be molten, and introducing $TiO_2$ into said molten salt bath.

25. The process as defined by claim 1, wherein said molten salt bath is initially prepared by maintaining $Ba(NO_3)_2$, $KNO_3$ and NaOH at a temperature so as to be molten, and introducing $TiCl_3$ into said molten salt bath.

* * * * *